US012614562B2

(12) United States Patent
Kurebayashi et al.

(10) Patent No.: US 12,614,562 B2
(45) Date of Patent: Apr. 28, 2026

(54) PROCESSING METHOD FOR FORMING A WORK HAVING A PAIR OF FLANGE BENDING PARTS

(71) Applicant: NHK SPRING CO., LTD., Yokohama (JP)

(72) Inventors: Sosuke Kurebayashi, Yokohama (JP); Yohei Mitsumori, Yokohama (JP); Naoki Iwamoto, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 19/021,924

(22) Filed: Jan. 15, 2025

(65) Prior Publication Data

US 2025/0157486 A1 May 15, 2025

Related U.S. Application Data

(62) Division of application No. 17/335,472, filed on Jun. 1, 2021, now Pat. No. 12,230,300.

(30) Foreign Application Priority Data

Jun. 3, 2020 (JP) ................................. 2020-097086

(51) Int. Cl.
| | |
|---|---|
| *G11B 5/48* | (2006.01) |
| *B21D 19/06* | (2006.01) |
| *B21D 22/26* | (2006.01) |
| *B21D 24/00* | (2006.01) |
| *B21D 37/10* | (2006.01) |

(Continued)

(52) U.S. Cl.
CPC ............ *G11B 5/4833* (2013.01); *B21D 19/06* (2013.01); *B21D 22/26* (2013.01); *B21D 37/10* (2013.01); *B21D 53/88* (2013.01); *G11B 5/484* (2013.01); *G11B 21/21* (2013.01); *B21D 24/00* (2013.01); *Y10T 29/49025* (2015.01)

(58) Field of Classification Search
None
See application file for complete search history.

(56) References Cited

U.S. PATENT DOCUMENTS

| | | | | | |
|---|---|---|---|---|---|
| 5,471,734 | A | * | 12/1995 | Hatch et al. ......... | G11B 5/4833 |
| | | | | | 29/603.03 |
| 2008/0055771 | A1 | * | 3/2008 | Suzuki ................... | G11B 5/486 |
| | | | | | 360/86 |

(Continued)

OTHER PUBLICATIONS

Office Action (Ex Parte Quayle) dated Dec. 17, 2025 issued in related U.S. Appl. No. 19/021,851.

*Primary Examiner* — Craig A. Renner
(74) *Attorney, Agent, or Firm* — Holtz, Holtz & Volek PC

(57) ABSTRACT

A processing method of a work includes: forming flange bending parts at respective side parts of the work, the flange bending parts including first bending parts extending in a length direction of the work; holding a first part of the work in the length direction where the flange bending parts are formed between a die and a pad; and pressing a second part of the work in the length direction in a thickness direction to form a second bending part extending in a width direction of the work between the first part and the second part. The die includes a supporting surface supporting the work, a first relief part including a first inclined surface, and a second relief part including a second inclined surface.

1 Claim, 7 Drawing Sheets

(51) Int. Cl.
 B21D 53/88        (2006.01)
 G11B 21/21        (2006.01)

(56)               References Cited

U.S. PATENT DOCUMENTS

2011/0013318 A1 *   1/2011   Takigawa et al.  ...  G11B 5/4833
                                            360/246.1
2013/0057985 A1 *   3/2013   Yonekura ............  G11B 5/4833
                                            360/244.2

* cited by examiner

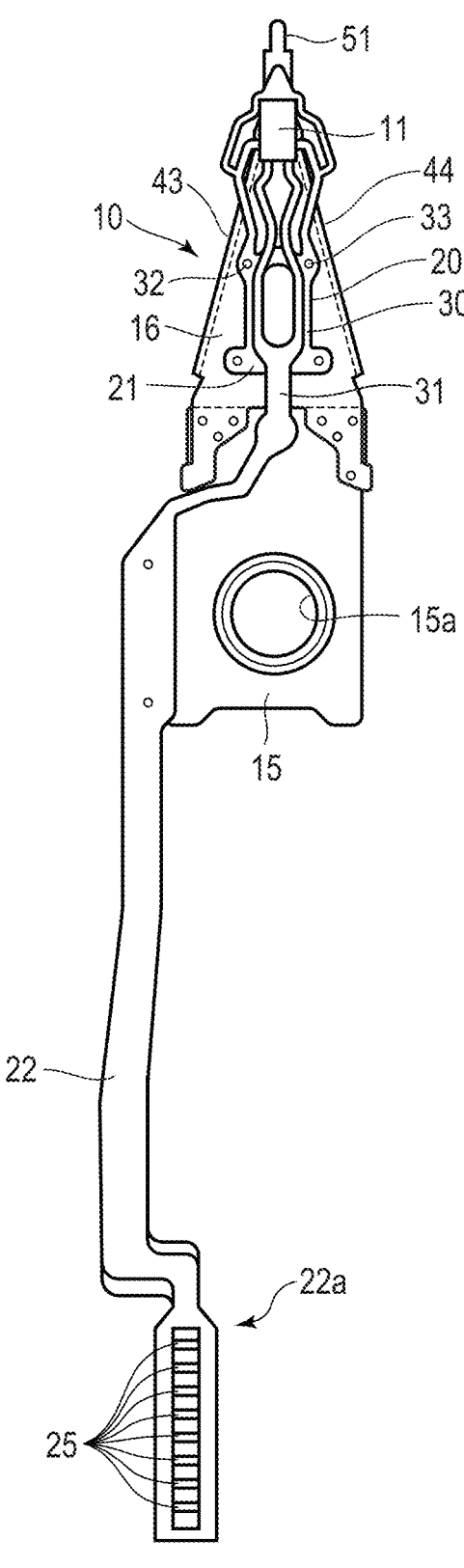
F I G. 3

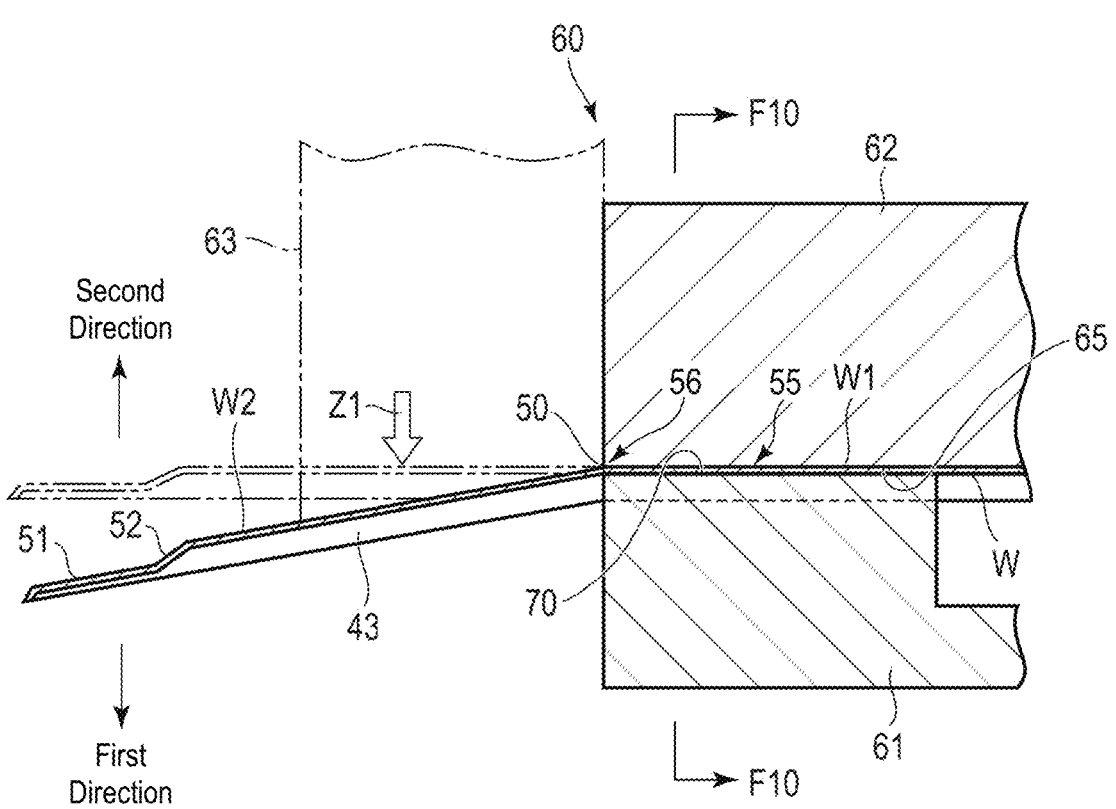
F I G. 9
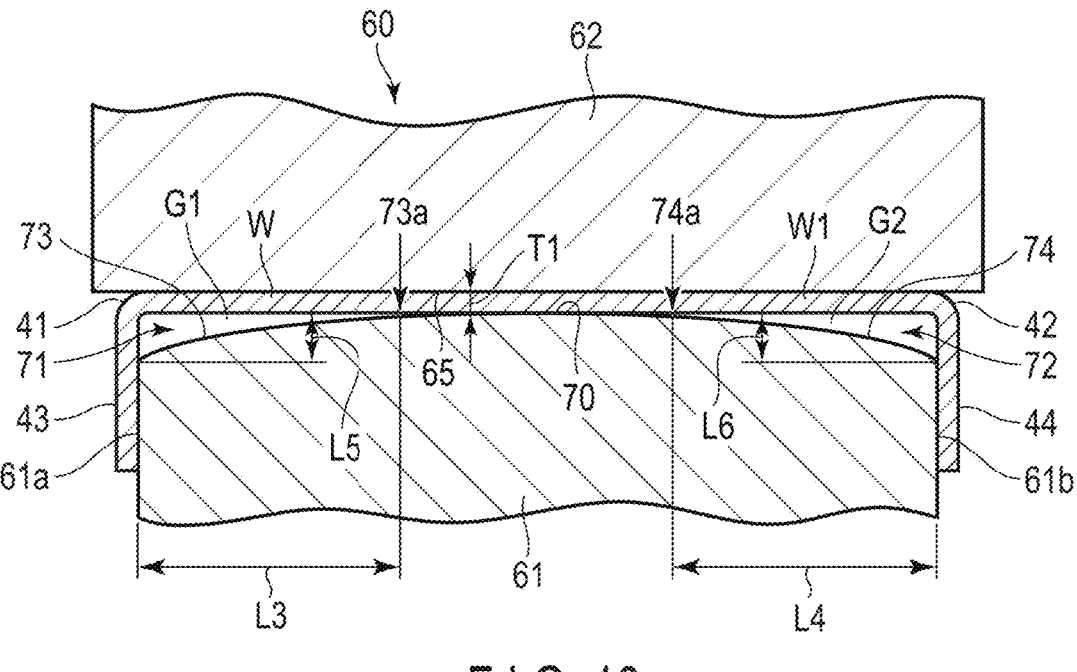
F I G. 10

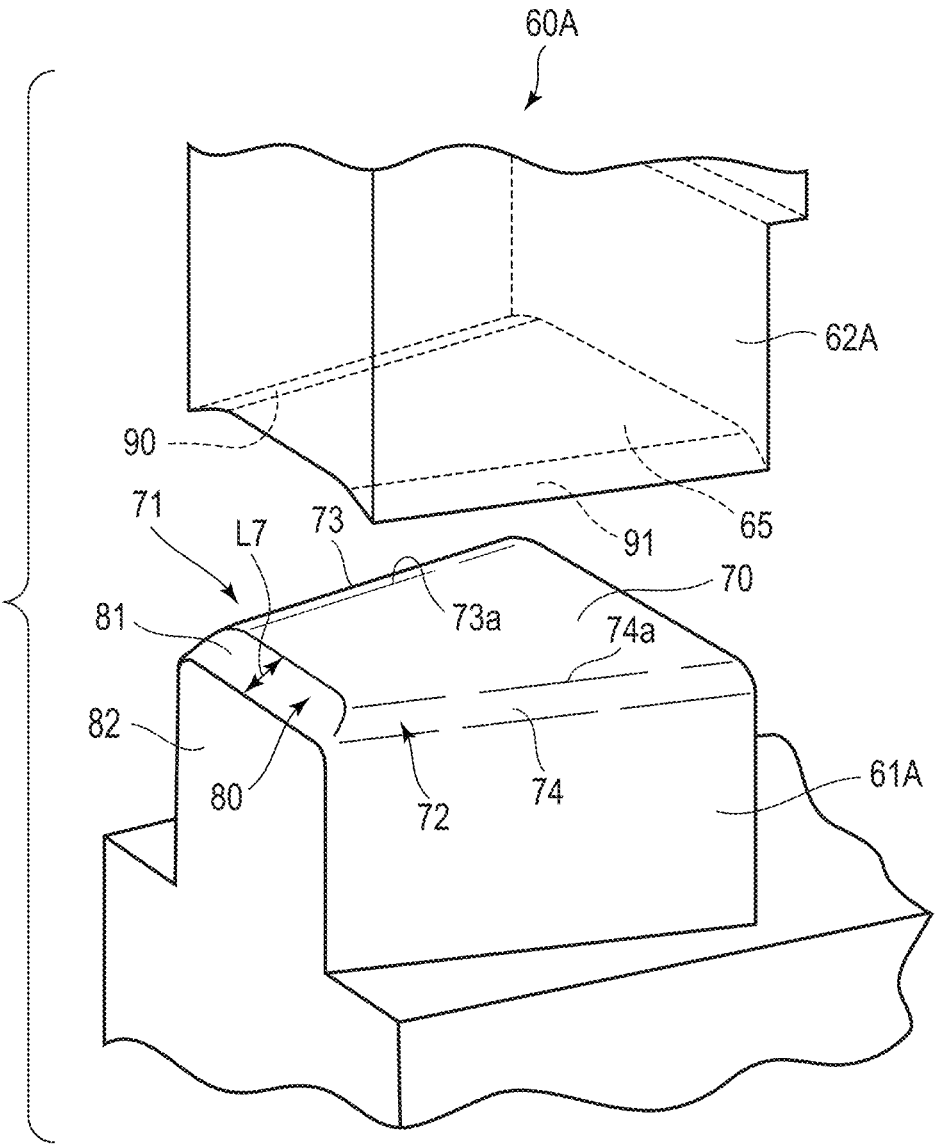
F I G. 11

PROCESSING METHOD FOR FORMING A WORK HAVING A PAIR OF FLANGE BENDING PARTS

CROSS-REFERENCE TO RELATED APPLICATIONS

This application is a Divisional application of U.S. application Ser. No. 17/335,472, filed Jun. 1, 2021, which is based upon and claims the benefit of priority from prior Japanese Patent Application No. 2020-097086, filed Jun. 3, 2020, the entire contents of both of which are incorporated herein by reference.

BACKGROUND OF THE INVENTION

1. Field of the Invention

The present invention relates to a disc drive suspension including a load beam, die set used to bend a load beam, and manufacturing method of a load beam.

2. Description of the Related Art

Disc drives are used in information processing devices such as a personal computer. The disc drive includes a magnetic disc which rotates about a spindle and a carriage spinning about a pivot axis. A disc drive suspension is provided with an arm of the carriage.

The disc drive suspension includes, for example, a base plate, load beam, and flexure arranged along the load beam. A slider is provided with a gimbal part formed in the proximity of the tip of the flexure. An element configured to perform access to a disc to read/write data from/to the disc is provided with the slider. Examples of the conventional suspension are disclosed in US 2014/0268427 A (Patent Literature 1), and JP 2003-151232 A (Patent Literature 2).

The load beam is formed of a metal plate such as stainless steel. The load beam includes a substantially-flat load beam main body part and a pair of flange bending parts formed in both side parts of the load beam main body part. Each of the flange bending parts extends in a length direction of the load beam. The flange bending part is formed by bending both side parts of the load beam at approximately 90° in the thickness direction in the first bending part. JP 2005-177790 A (Patent Literature 3) discloses that, when a work including a flange bending part is pressed, the work is slightly warped in the longitudinal direction.

Depending on specifics of the suspension, there may be a second bending part extending in the width direction of the load beam formed in the middle part of the length direction of the load beam. The second bending part may be referred to as sag. The second bending part is formed by slightly bending the middle part of the load beam in the length direction to the thickness direction (for example, at a few degrees).

In the manufacturing process of the load beam, the flange bending part is formed with a first die set, and then, the second bending part is formed with a second die set. High accuracy is required for the load beam. Through detailed inspection of a shape of a load beam subjected to a bending treatment, some problems to be dealt with were found.

For example, in the inspection of cross-section of the load beam along the width direction, which has a pair of flange bending parts, the shape of the load beam has no problem before the formation of the second bending part in the load beam whereas there was found a warped deformation in the proximity of the flange bending part after the formation of the second bending part.

A warped deformation in the proximity of the flange bending part of the load beam would cause malfunction. For example, in the assembly state in which a flexure is disposed on the surface of the load beam, the gap between the load beam and the flexure may become uneven. When the gap between the load beam and the flexure becomes uneven, they would contact to each other unevenly. This would affect the gimbal movement of the flexure, and minute metal particles produced by the friction between the flexure and the load beam, and thus, it is undesirable.

BRIEF SUMMARY OF THE INVENTION

The present application will present a disc drive suspension with improved load beam shape (especially, the shape of cross-section in the width direction), die set for the load beam, and manufacturing method of the load beam.

According to an embodiment, a disc drive suspension with a load beam and a flexure, wherein the load beam comprises: a load beam main body; a pair of flange bending parts each including a first bending part formed in both sides of the load beam main body; a second bending part extending in the width direction of the load beam main body; a first cross-section part; and a second cross-section part.

The flange bending parts each extend in the length direction of the load beam main body. The second bending part is formed between the flange bending parts. The first cross-section part extends in the width direction of the load beam main body through welding parts to which the flexure is fixed, and the first cross-section part is warped up toward the flange bending parts. The second cross-section part extends in the width direction of the load beam main body through a position different from those of the welding parts, and the second cross-section part has a lesser height difference as compared to the first cross-section part.

According to the above embodiment, the first cross-section of the load beam has a shape to be warped up toward the flange bending part. However, the flexure is fixed to the first cross-section part through the welding part, and thus, unevenness of the gap between the load beam and the flexure can be avoided. The second cross-section part passing through the position different from those of the welding parts has a substantially flat shape with a lesser height difference as compared to the first cross-section part. Thus, unevenness of the gap between the load beam and the flexure can be suppressed, and unstable contact between the flexure and the load beam can be avoided.

According to an embodiment, a die set includes a die, a pad, and a punch. The die supports a first part of the work in the length direction. The pad includes a pressure surface which holds the work with the die. The punch presses a second part of the work in the length direction to a thickness direction of the work while the first part of the work is held between the die and the pad.

The die includes a flat supporting surface which supports the work, a first relief part, and a second relief part. The first relief part includes a first inclined surface. The second relief part includes a second inclined surface. Distance of the first inclined surface from the pad increases toward one side surface of the die from one end of the supporting surface in the width direction. Distance of the second inclined surface from the pad increases toward the other side surface of the die from the other end of the supporting surface in the width direction.

The die set of an embodiment includes a first convex part opposed to the first relief part in the proximity of one side part of the pressure surface of the pad, and a second convex part opposed to the second relief part in the proximity of the other side part of the pressure surface. Furthermore, the die set of an embodiment includes a third relief part including a third inclined surface distance of which from the pad increases toward a tip surface of the die in the tip part of the die.

According to an embodiment, a manufacturing method of the load beam forms the second bending part with the die set. That is, while the first part of the work is held between the die and the pad, a first gap is defined between the first inclined surface of the die and the work. Furthermore, a second gap is defined between the second inclined surface of the die and the work. By pressing the second part of the work in the thickness direction, the second bending part is formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a plan view of a disc drive suspension of an embodiment.

FIG. 9 is a cross-sectional view of the die set and the work of FIG. 8.

FIG. 10 is a cross-sectional view of the die set, taken along line F10-F10 in FIG. 9.

FIG. 11 is a perspective view of a part of a die set of a second embodiment.

DETAILED DESCRIPTION OF THE INVENTION

Hereinafter, a disc drive suspension (hereinafter referred to as suspension) with a load beam of an embodiment will be explained with reference to FIGS. 1 to 10.

Figure 1:
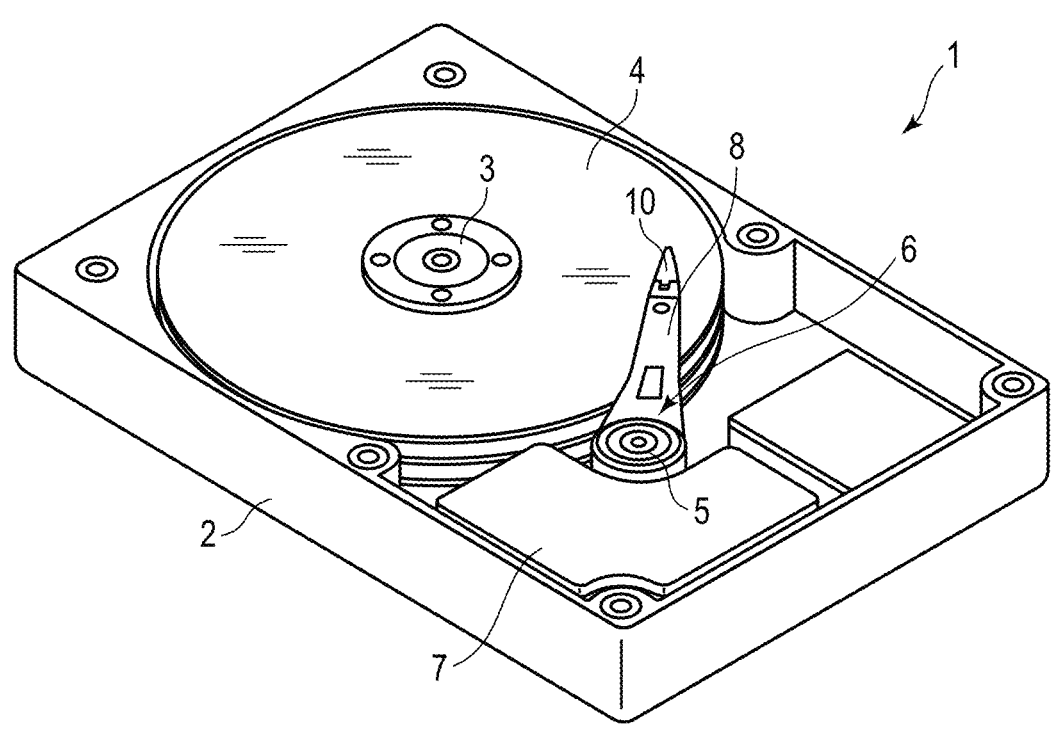
FIG. 1 is a perspective view of an example of a disc drive.

A disc drive (hard disc drive) 1 shown in FIG. 1 includes a case 2, disc (magnetic disc) 4 which rotates about a spindle 3, carriage 6 which spins about a pivot axis 5, and positioning motor 7 which spins the carriage 6. The case 2 is sealed with a lid which is not shown.

Figure 2:
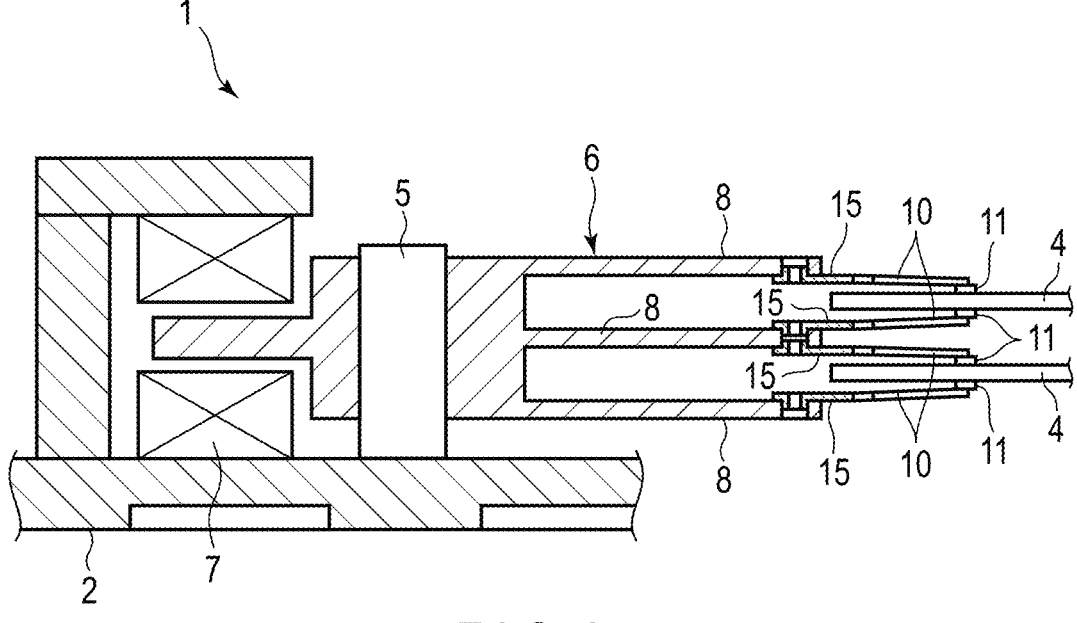
FIG. 2 is a cross-sectional view of a part of the disc drive of FIG. 1.

FIG. 2 is a schematic cross-sectional view of a part of the disc drive 1. An arm 8 is provided with the carriage 6. A suspension 10 is provided with the tip of the arm 8. A slider 11 of the magnetic head is provided with the proximity of the tip of the suspension 10. When the disc 4 rotates, air bearing is produced between the disc 4 and the slider 11. An element to record data to the disc 4 and an element to read data from the disc 4 are provided with the slider 11.

FIG. 3 is a plan view of an example of the suspension 10. The suspension 10 includes, for example, a base plate 15, load beam 16, and flexure 20. The slider 11 is disposed in the tip of the flexure 20. A boss part 15a of the base plate 15 is fixed to the arm 8 of the carriage (in FIGS. 1 and 2). The load beam 16 is formed of a stainless steel plate.

As in FIG. 3, the flexure 20 includes, for example, a part 21 overlapping the load beam 16 and a flexure tail 22 extending to the rear direction of the base plate 15. The flexure tail 22 includes a tail pad 22a. In the tail pad 22a, a terminal (tail electrode) 25 to be connected to an electronic device such as amplifier is disposed.

The flexure 20 includes a metal base 30 (partly shown in FIG. 3) and a conductive line part 31 disposed along the metal base 30. The metal base 30 is formed of a stainless steel plate which is thinner than that of the load beam 16. The metal base 30 is fixed to the load beam 16 by welding parts 32 and 33 through, for example, laser spot welding.

Now, an embodiment of the load beam 16 will be explained.

Figure 4:
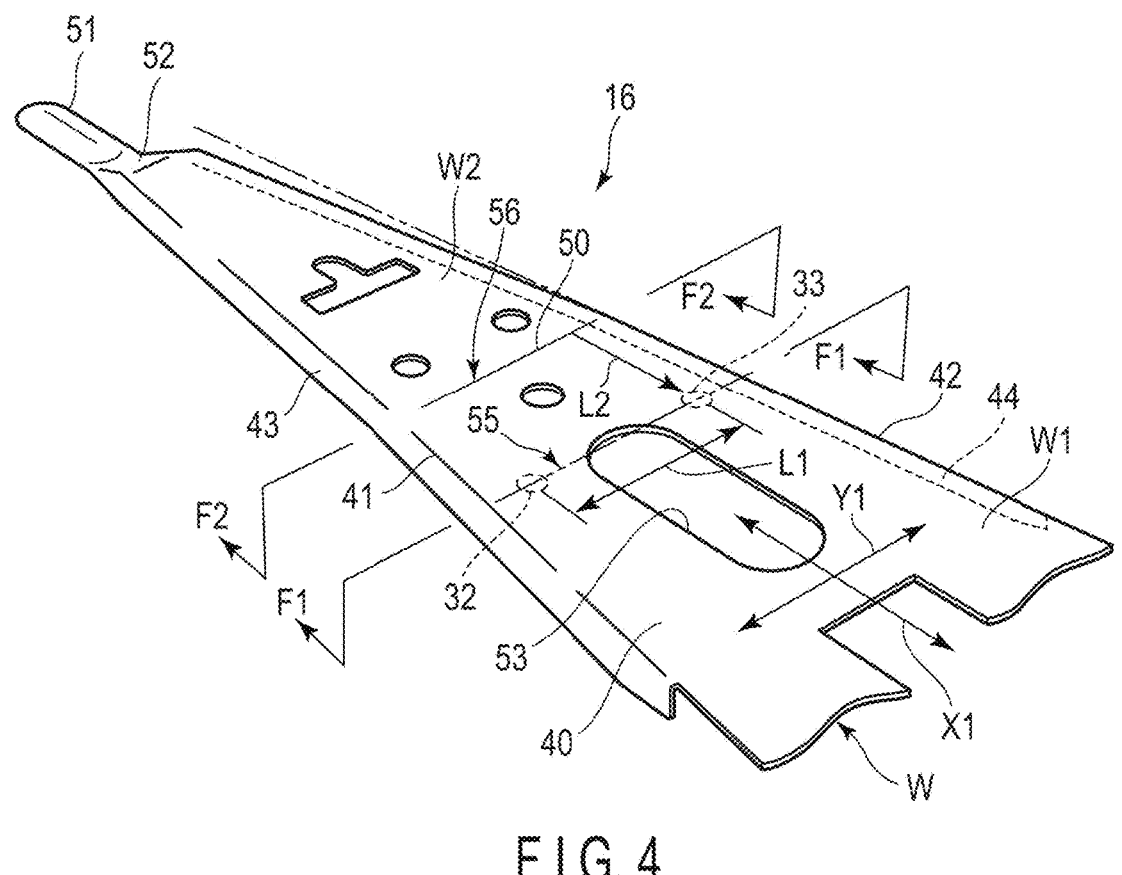
FIG. 4 is a perspective view of a load beam of the suspension of FIG. 1.

The load beam 16 shown in FIG. 4 includes a substantially flat load beam main body 40, flange bending parts 43 and 44 including first bending parts 41 and 42, and second bending part 50. The flange bending parts 43 and 44 are formed in both sides of the load beam main body 40. The second bending part 50 extends in the width direction of the load beam main body 40. Bidirectional arrow X1 in FIG. 4 indicates a length direction of the load beam 16. Bidirectional arrow Y1 indicates a width direction of the load beam 16.

The flange bending parts 43 and 44 including the first bending parts 41 and 42 each extend in the length direction of the load beam 16. The second bending part 50 extends in the width direction of the load beam 16. The second bending part 50 is formed by bending the middle part of the load beam main body 40 in the length direction to the thickness direction.

A step 52 is formed between the tip 51 of the load beam 16 and the load beam main body 40. In the present application, with reference to the second bending part 50, the side closer to the tip 51 may be referred to as front side of the load beam, and the side distant from the tip 51 may be referred to as rear side of the load beam. An opening 53 is formed in the load beam main body 40.

As shown in FIG. 3, the load beam 16 and the flexure 20 are fixed to each other by the welding parts 32 and 33 through, for example, laser spot welding. The welding parts 32 and 33 are formed between a pair of flange bending parts 43 and 44. As shown in FIG. 4, the welding parts 32 and 33 are apart from each other by a distance L1 in the width direction of the load beam 16. Moreover, the welding parts 32 and 33 are apart from each other by a distance L2 to the rear side of the load beam 16 from the second bending part 50.

Figure 5:
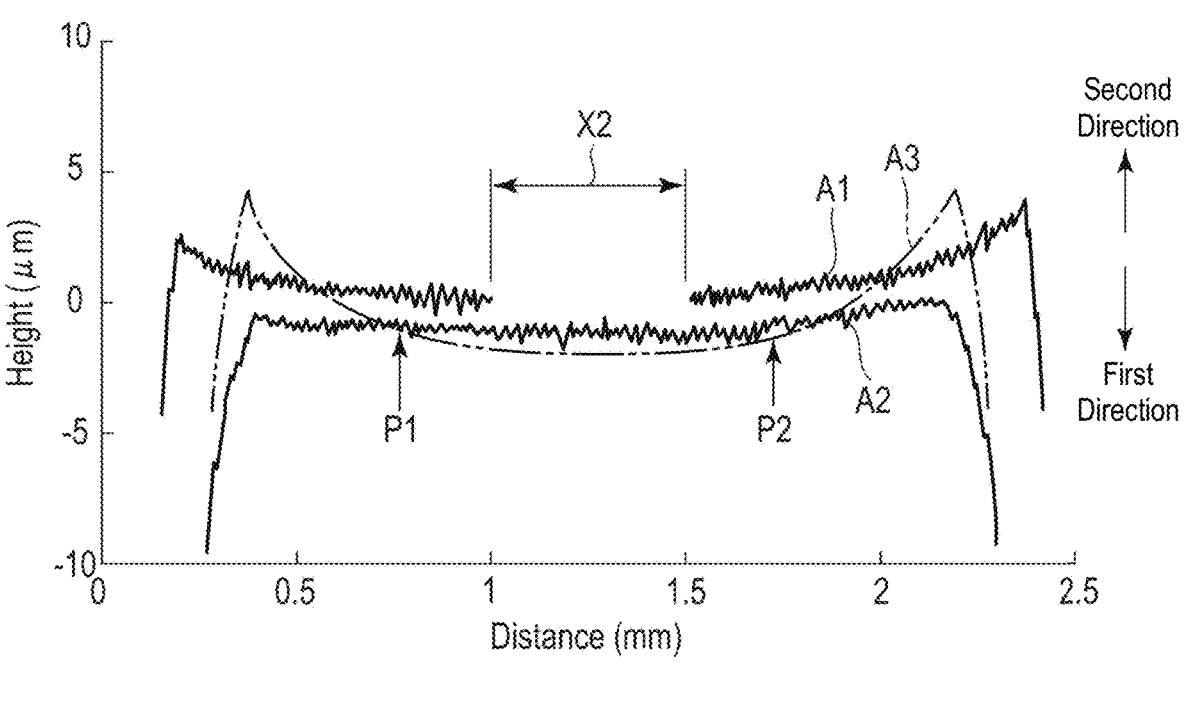
FIG. 5 is a diagram illustrating a relationship between a position of cross-section along a width direction of the load beam of FIG. 4 and a height.

FIG. 5 indicates heights of two cross-sections of the load beam 16 in the width direction (first cross-section 55 and second cross-section 56), which were measured by a detector. In FIG. 5, the horizontal axis indicates positions in the width direction, and the vertical axis indicates the height.

Line A1 in FIG. 5 indicates a height of the surface of the first cross-section 55, taken along line F1-F1 in FIG. 4. The first cross-section 55 passes through the welding parts 32 and 33 in the width direction of the load beam 16. Since the bidirectional arrow X2 in FIG. 5 is an area corresponding to the opening 53, the height thereof is not detected.

As shown by line A1 in FIG. 5, the first cross-section 55 is shaped to be warped up toward the flange bending parts 43 and 44. The first cross-section 55 has a greater height difference as compared to the second cross-section 56. The load beam 16 and the flexure 20 are fixed to each other through the welding parts 32 and 33. Thus, even if the height difference of the first cross-section 55 is great, a gap between the load beam 16 and the flexure 20 does not become unstable.

Line A2 in FIG. 5 indicates a height of the surface of the second cross-section 56, taken along line F2-F2 in FIG. 4. The second cross-section 56 passes through a position different from the welding parts 32 and 33 (through the front side of the welding parts 32 and 33). The second cross-section 56 extends in the width direction of the load beam along the second bending part 50.

As shown by line A2 in FIG. 5, the second cross-section 56 has a smaller height difference as compared to the first cross-section 55 (within 2 to 3 μm), and is substantially flat. Thus, in the assembly state in which the load beam 16 and the flexure 20 are fixed to each other, unevenness of the gap between the load beam 16 and the flexure 20 is small. Thus, unstable contacts between the load beam 16 and the flexure 20 can be avoided.

Double-dotted line A3 in FIG. 5 indicates a height of cross-section of a load beam of a comparative example (corresponding to second cross-section 56 of the present embodiment). In this comparative example, a second bending part 50 is bent by a conventional die.

As shown by the double-dotted line A3 in FIG. 5, cross-section of the comparative example is greatly warped toward flange bending parts 43 and 44, and the height of warping is above 5 μm. Thus, in the assembly state in which the load beam and the flexure are fixed to each other, a gap between the load beam and the flexure becomes greatly uneven. Thus, in such a comparative example, the load beam and the flexure may unstably contact to each other.

Now, a die set 60 used in the manufacturing of the load beam 16 of the present embodiment, and a manufacturing method of the load beam 16 will be explained.

Figure 6:
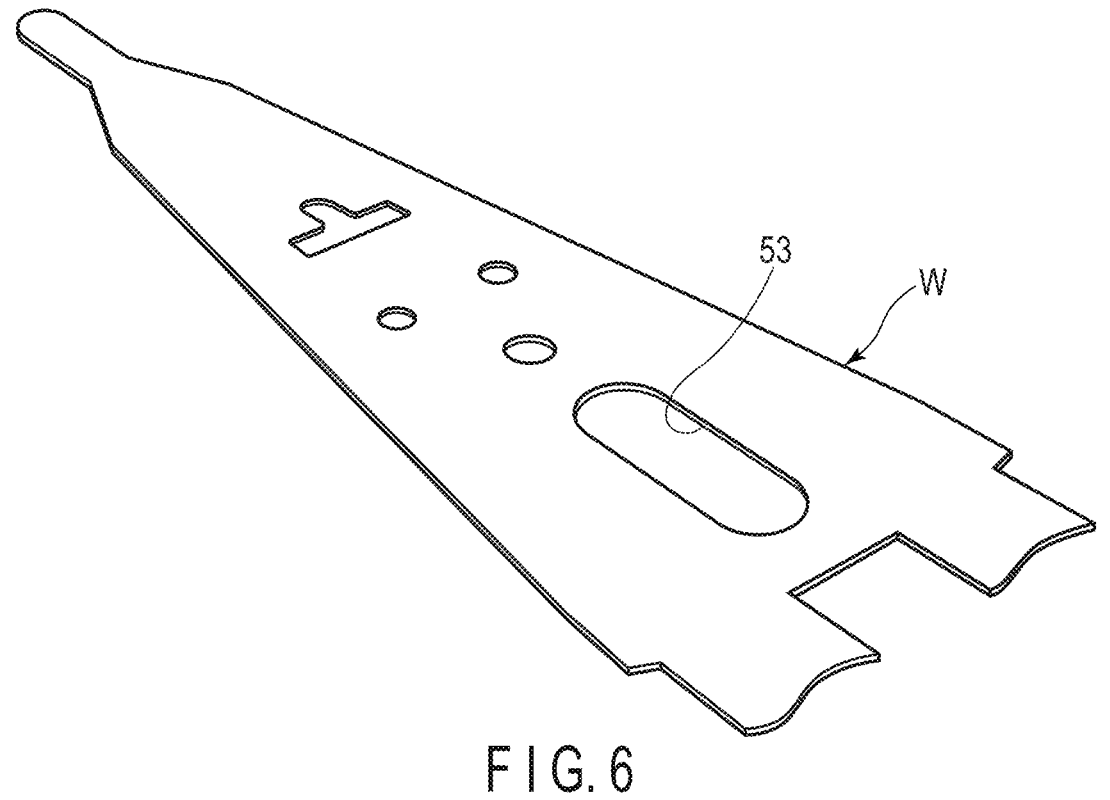
FIG. 6 is a perspective view of a work of the load beam.

FIG. 6 indicates an unfinished load beam 16 in the manufacturing process (will be referred to as work W). The work W before the bending treatment is flat. The length direction of the work W corresponds to the length direction of the load beam 16 (as shown by the bidirectional arrow X1 in FIG. 5). The width direction of the work W corresponds to the width direction of the load beam 16 (as shown by the bidirectional arrow Y1 in FIG. 5).

Figure 7:
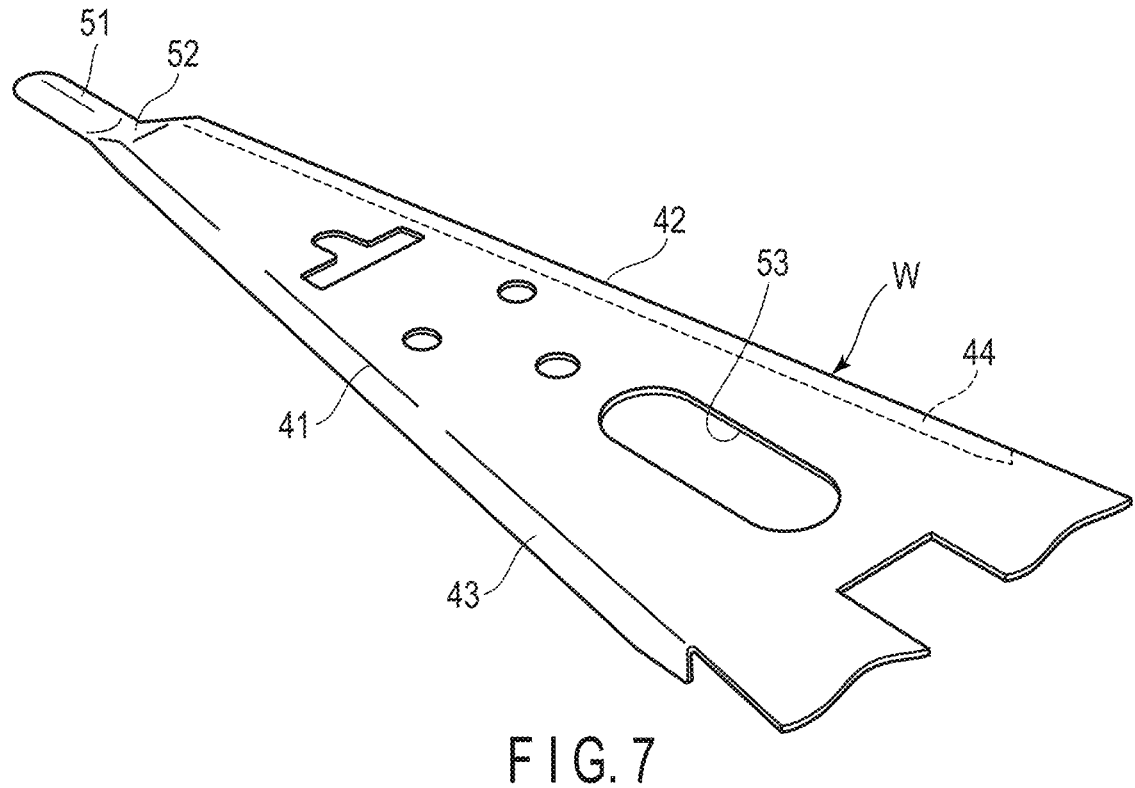
FIG. 7 is a perspective view of the work with flange bending parts.

FIG. 7 indicates the work W with the flange bending parts 43 and 44 formed by a first bending treatment. In the first bending treatment, the both side parts of the work W are bent almost perpendicularly by a die to form the flange bending parts 43 and 44 including the first bending parts 41 and 42. Furthermore, the tip 51 of the load beam 16 and also the step 52 are formed by pressing.

After the formation of the flange bending parts 43 and 44, a second bending treatment is performed. In the second bending treatment, the second bending part 50 is formed by bending the middle part of the work W in the length direction using the die set 60 which will be described below. With reference to the second bending part 50, the work W includes a first part W1 which corresponds to the rear side of the load beam 16 and a second part W2 which corresponds to the front side of the load beam 16.

Figure 8:
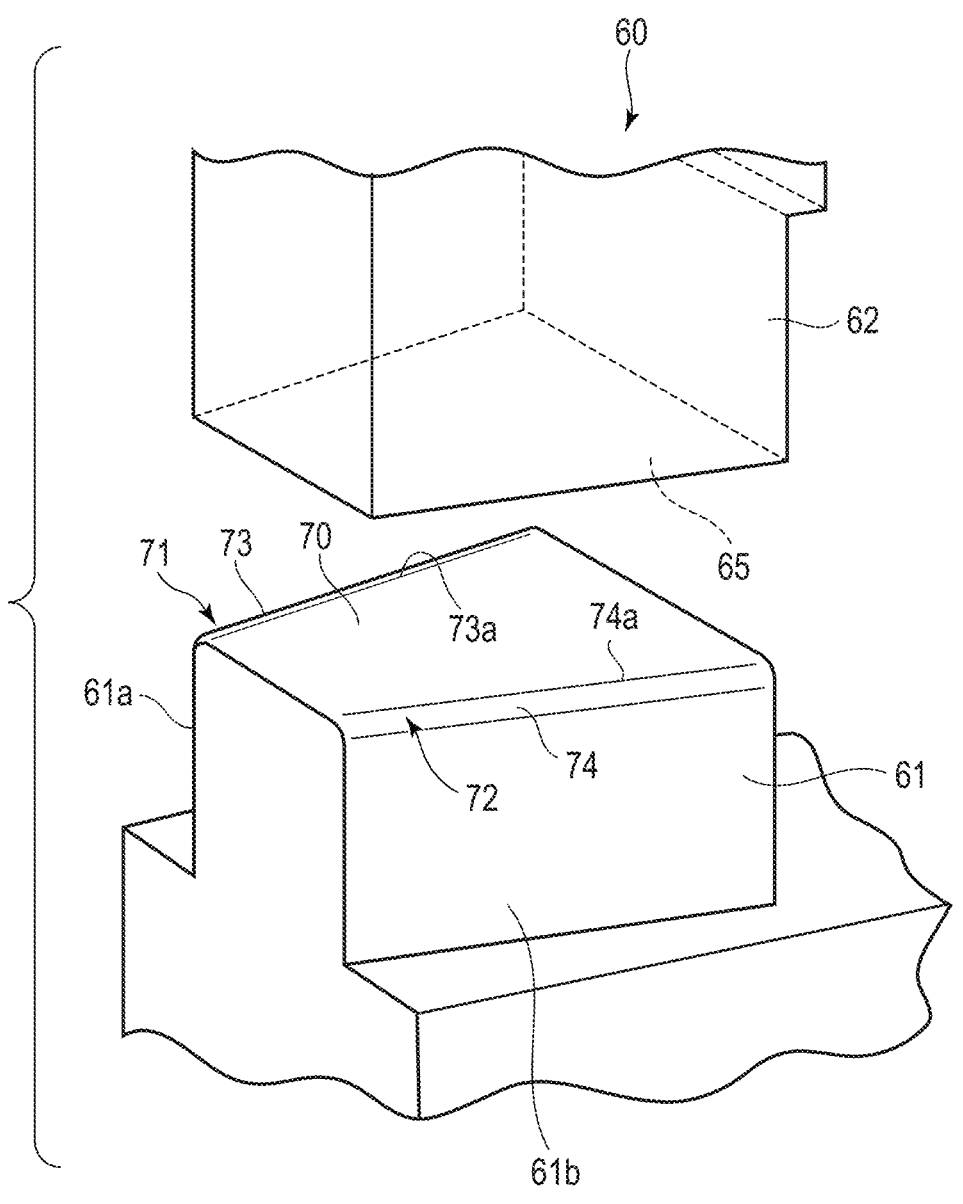
FIG. 8 is a perspective view of a die set of a first embodiment.

FIG. 8 illustrates the die set 60 used in the bending of the second bending part 50. FIG. 9 is a cross-sectional view of the die set 60 and the work W. FIG. 10 is a cross-sectional view of the die set 60 and the work W, taken along line F10-F10 in FIG. 9.

The die set 60 includes a die 61, pad 62, and punch 63 (depicted with double-dotted line in FIG. 9). On the die 61, the first part W1 of the work W is placed. The pad 62 is disposed above the die 61. The pad 62 moves vertically by a driving mechanism. A pressing surface 65 is formed on the lower surface side of the pad 62. The pressing surface 65 us flat, and extends horizontally.

In the second bending treatment, as shown in FIGS. 9 and 10, the first part W1 of the work W is held between the die 61 and the pad 62. In this state, the punch 63 is moved by the driving mechanism in the direction indicated by arrow Z1 (shown in FIG. 9). Through this process, the second bending part 50 is formed between the first part W1 and the second part W2 of the work W.

The upper surface of the die 61 includes a flat supporting surface 70 extending horizontally and relief parts 71 and 72 formed in both sides of the supporting surface 70. The first relief part 71 includes a first inclined surface 73. The first inclined surface 73 extends in the longitudinal direction of the die 61 along one side surface 61a of the die 61. The second relief part 72 includes a second inclined surface 74. The second inclined surface 74 extends in the longitudinal direction of the die 61 along the other side surface 61b of the die 61.

The first inclined surface 73 is declivous toward one side surface 61a of the die 61 from one end of the supporting surface 70 in the width direction. That is, the first inclined surface 73 is inclined such that a distance thereof from the pressing surface 65 of the pad 62 increases toward the one side surface 61a of the die 61. The second inclined surface 74 is declivous toward the other side surface 61b of the die 61 from the other end of the supporting surface 70 in the width direction. That is, the second inclined surface 74 is inclined such that a distance thereof from the pressing surface 65 of the pad 62 increases toward the other side surface 61b of the die 61.

As shown in FIG. 10, the first inclined surface 73 is formed from the one end of the supporting surface 70 of the die 61 to the one side surface 61a over the width L3. The second inclined surface 74 is formed from the other end of the supporting surface 70 of the die 61 to the other side surface 61b over the width L4. Starting points 73a and 74a of the inclined surface 73 and 74 (boundary of the supporting surface 70) are, preferably, positions P1 and P2 in FIG. 5. The positions P1 and P2 are positions where the warping becomes great in the cross-section of the load beam of the comparative example which is depicted with the double-dotted line A3 in FIG. 5.

The first inclined surface 73 and the second inclined surface 74 are curved arc surfaces distance of which from the pressuring surface 65 increases toward the side surfaces 61 and 61b of the die 61. Note that, the inclined surfaces 73 and 74 may be inclined surfaces height of which linearly decreases toward the side surfaces 61a and 61b of the die from the supporting surface 70.

As shown in FIG. 10, depths L5 and L6 of the relief parts 71 and 72 are greater than the degree of warping of the load beam of the comparative example which is depicted by the double-dotted line A3 in FIG. 5. The depths L5 and L6 of the relief parts 71 and 72 are greater than the thickness T1 of the work W (shown in FIG. 10). The depths L5 and L6 are, preferably, twice or more than the degree of warping of the load beam of the comparative example which is depicted by the double-dotted line A3 in FIG. 5. The widths L3 and L4 of the relief parts 71 and 72 are greater than the depths L5 and L6 of the relief parts 71 and 72. The widths L3 and L4 of the relief parts 71 and 72 are five to ten times the depths L5 and L6 of the relief parts 71 and 72, for example.

As shown in FIG. 10, the first part W1 of the work W is held between the supporting surface 70 of the die 61 and the pressing surface 65 of the pad 62. Thus, a first gap G1 is defined between the first inclined surface 73 and the work W. Furthermore, a second gap G2 is defined between the second inclined surface 74 and the work W.

While the first part W1 of the work W is held between the die 61 and the pad 62, the punch 63 (shown in FIG. 9) moves in the direction of arrow Z1. When the second part W2 of the work W is pressed by the punch 63 to the thickness direction of the work W, the second part W2 of the work W is bent. Thus, the second bending part 50 is formed between the first part W1 and the second part W2.

After the second bending part 50 is formed, the punch 63 leaves the second part W2 of the work W. When the punch 63 leaves the second part W2, the work W tends to return to the original shape because of slight spring back. However, the first part W1 of the work W is strained between the supporting surface 70 of the die 61 and the pressing surface 65 of the pad 62. The relief parts 71 and 72 are formed in both sides of the supporting surface 70. Thus, the proximity of the flange bending parts 43 and 44 are not strained. In such a state, the second bending part 50 is formed. After the second bending part 50 is formed, the punch 63 leaves the work W.

The die 61 of the die set 60 of the present embodiment includes the relief parts 71 and 72 including declivous inclined surfaces 73 and 74 in both sides of the supporting surface 70. Thus, gaps G1 and G2 (shown in FIG. 10) are defined in the proximity of the flange bending parts 43 and 44. Using the die 61 with such relief parts 71 and 72, the second bending part 50 is formed. Therefore, warping of the second cross-section 56 in the proximity of the flange bending parts as depicted by the line A2 in FIG. 5 can be avoided.

As explained above, the manufacturing method of the load beam 16 of the present embodiment includes the first bending treatment and the second bending treatment.

(1) In the first bending treatment, the flange bending parts 43 and 44 including the first bending parts 41 and 42 are formed in both sides of the work W.

(2) After the flange bending parts 43 and 44 are formed in the first bending treatment, the second bending treatment is performed. In the second bending treatment, the first part W1 of the work W in the length direction is held between the supporting surface 70 of the die 61 and the pressing surface 65 of the pad 62. When the work W is held between the die 61 and the pad 62, the first gap G1 is defined between the first relief part 71 and the work W. Furthermore, the second gap G2 is defined between the second relief part 72 and the work W.

(3) While the work W is held between the die 61 and the pad 62, the second part W2 of the work W is pressed in the thickness direction by the punch 63. Through the pressing, the second bending part 50 is formed. Immediately after that, the punch 63 leaves the work W.

FIG. 11 illustrates a die set 60A of a second embodiment. The die set 60A of the present embodiment includes a die 61A and a pad 62A. A third relief part 80 is formed at the tip of the die 61A, that is, at the position which becomes a pivot point in the bending of the second bending part 50. The third relief part 80 has a length L7 which is more than ten times the thickness of the work. The third relief part 80 includes a third inclined surface 81. The third inclined surface 81 extends in the width direction of the die 61A. The third inclined surface 81 becomes more distant from the pressing surface 65 of the pad 62A toward the tip surface 82 of the die 61A from the supporting surface 70 of the die 61A.

The pad 62A shown in FIG. 11 includes, in the proximity of one side of the pressing surface 65, a first convex part 90 which is opposed to the first relief part 71. A second convex part 91 which is opposed to the second relief part 72 is in the proximity of the other side of the pressing surface 65. The convex parts 90 and 91 are shaped to correspond to the inclined surfaces 73 and 74 of the relief parts 71 and 72. Other structures and their functions of the die set 60A of the second embodiment are the same as those of the die set 60 of the first embodiment (shown in FIGS. 8 to 10), and thus, the shared elements are referred to by the same reference numbers and the explanation thereof will be omitted.

Note that various changes are applicable to the load beam and the flexure of the suspension, and also to the die, pad, punch, and the like of the die set.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processing method of a work, the processing method comprising:

forming flange bending parts at respective side parts of the work, the flange bending parts including first bending parts extending in a length direction of the work;

holding a first part of the work in the length direction where the flange bending parts are formed between a die and a pad; and pressing a second part of the work in the length direction in a thickness direction to form a second bending part extending in a width direction of the work between the first part and the second part, wherein:

the die includes a supporting surface supporting the work, a first relief part including a first inclined surface a distance of which from the pad increases toward one side surface of the die from the supporting surface, and a second relief part including a second inclined surface a distance of which from the pad increases toward the other side surface of the die from the supporting surface, while the first part of the work is held between the die and the pad:

a first gap is formed between the first inclined surface of the die and the work, and a second gap is formed between the second inclined surface of the die and the work, and the second bending part is formed by pressing the second part of the work in the thickness direction.

* * * * *